United States Patent [19]

Birmingham, Jr. et al.

[11] Patent Number: 5,789,466

[45] Date of Patent: Aug. 4, 1998

[54] LASER MARKING OF FLUOROPOLYMER COMPOSITION

[75] Inventors: John Nicholas Birmingham, Jr., Wilmington; Dwight Alan Holtzen, Newark, both of Del.; James Francis Hunt, Mukilteo, Wash.; Robert Sterrett Jenkins, West Chester, Pa.; Peter Dwight Spohn; James Thomas Walnock, both of Wilmington, Del.

[73] Assignee: E. I. du Pont de Nemours and Company, Wilmington, Del.

[21] Appl. No.: 646,163

[22] Filed: May 7, 1996

Related U.S. Application Data

[62] Division of Ser. No. 387,987, Feb. 13, 1995, Pat. No. 5,560,845, which is a continuation of Ser. No. 203,157, Feb. 28, 1994, abandoned.

[51] Int. Cl.$^6$ ........................................ C08K 9/06
[52] U.S. Cl. .................. 523/213; 523/212; 523/209; 523/216; 523/136; 523/137; 524/497
[58] Field of Search ........................... 523/212, 213, 523/209, 216, 136, 137; 524/497, 261

[56] References Cited

U.S. PATENT DOCUMENTS

| | | | |
|---|---|---|---|
| 3,834,924 | 9/1974 | Grillo | 106/308 N |
| 4,820,750 | 4/1989 | Lehr et al. | 523/213 |
| 5,206,280 | 4/1993 | Williams | 524/409 |
| 5,308,913 | 5/1994 | Asai et al. | 524/546 |

FOREIGN PATENT DOCUMENTS

| | | |
|---|---|---|
| 55-143525 | 11/1980 | Japan . |
| 1041104 | 2/1989 | Japan . |
| 1153529 | 6/1989 | Japan . |
| 4173828 | 6/1992 | Japan . |
| 4348354 | 12/1992 | Japan . |
| 7053774 | 2/1995 | Japan . |
| 7053884 | 2/1995 | Japan . |

Primary Examiner—Vasu Jagannathan
Assistant Examiner—U. K. Rajguru

[57] ABSTRACT

Laser marking of pigmented fluoropolymer substrates is enhanced by using titanium dioxide pigment coated with organo silane.

7 Claims, 11 Drawing Sheets

5,789,466

1

LASER MARKING OF FLUOROPOLYMER COMPOSITION

This is a division of application Ser. No. 08/387,987, filed Feb. 13 1995, now U.S. Pat. No. 5,560,845, which is a continuation of patent application Ser. No. 08/203,157, filed Feb. 28, 1994 by the same inventors.

FIELD OF THE INVENTION

This invention is in the field of laser marking of fluoropolymer composition substrates.

BACKGROUND OF THE INVENTION

European Patent Application 329884/1989 discloses a method of marking a cable using an intense source of ultraviolet or visible radiation, preferably a laser source. According to this method, the exposure of PTFE, FEP, and ETFE electrical insulating layers containing up to 20 wt %, preferably up to 5 wt %, of $TiO_2$ as photosensitive substance to the intense radiation results in a darkening where the radiation is incident. By controlling the pattern of incidence, marks such as letters and numerals can be formed.

The darkening of the substrate is understood to be caused primarily by interaction between the radiation and the $TiO_2$ pigment. When ultraviolet (UV) radiation is used and the polymer matrix is transparent to UV as for PTFE and FEP, this interaction will be the sole contribution to darkening. In some cases, the polymer itself may darken somewhat and contribute to the mark, as for ETFE.

The laser marking technique is attractive for generating identifying marks on insulated wires to be used in complex wire harnesses, such as those found in airplanes. Since the multiplicity of circuits would impose unreasonable demands on color coding and on inventory, and since white is good background for marking, white is favored for such uses. Laser marking has advantages over alternative marking techniques such as hot stamping and ink printing, in that there is no potential for mechanical damage as in hot stamping, the difficulties of adhering inks to fluoropolymers are avoided, and the mark is actually beneath the surface and not easily abraded away.

An important characteristic that contributes to the readability of a mark is the contrast between mark and background. Contrast numerically is the difference between reflectances of mark and background, divided by reflectance of the background, and may be expressed as a number in the range 0–1 or in percent. Maximum possible numerical contrast corresponds to an absolutely black mark (zero reflectance). If the mark is not absolutely black (non-zero reflectance), then the whiteness of the background contributes with numerical contrast increasing as background reflectance approaches unity. Minimum contrast acceptable to aircraft manufacturers for ease of wire identification is about 60% for melt-fabricated fluoropolymer insulation or jacket. While existing compositions comprising $TiO_2$ pigment in a fluoropolymer matrix have provided generally white appearance, such substrates sometimes yield laser marks with good contrast, but at other times relatively poor contrast. This is illustrated by the photomicrographs of laser marks in FIG. 6. The mark in FIG. 6(b) has low contrast with respect to the background, of the order of 50% and would not meet a minimum contrast requirement of 60%. Improved contrast and uniformity of contrast are desired to facilitate identification of wires by operators during production and maintenance operations on wire harnesses, for example, those used in aircraft electrical systems.

2

U.S. Pat. No. 5,206,280 discloses the use of a second white pigment that does not absorb UV radiation to enhance background whiteness and thereby enhance the contrast of laser marks. No performance data are given.

SUMMARY OF THE INVENTION

This invention provides an improved laser-markable fluoropolymer substrate which can be formed by melt processing of a fluoropolymer composition containing $TiO_2$ pigment. According to the present invention, it has been discovered that $TiO_2$ pigment when melt compounded with a melt-fabricable fluoropolymer, while yielding a white appearance, is also characterized by the presence of some agglomerates. These agglomerates are not visible to the naked eye; some can be observed in cross-sections of the melt-fabricated composition under high optical magnification, while most are only detectable under the magnifications of electron microscopy. It has been found that the substantial reduction of the population of these agglomerates present in fluoropolymer substrate for laser marking is accompanied by improved marking characteristics. This has been accomplished in the present invention by using $TiO_2$ pigment coated with organo silane in the fluoropolymer composition from which the substrate is formed.

One embodiment of the present invention is in the process of laser marking a melt-fabricated substrate comprising melt-fabricable fluoropolymer and $TiO_2$ pigment, the improvement comprising said $TiO_2$ pigment having a coating comprising organo silane.

Another embodiment is a fluoropolymer composition per se, comprising melt-fabricable fluoropolymer and $TiO_2$ coated with a coating comprising organo silane.

Another aspect of the present invention is the discovery that the aforesaid composition in a form yet to be melt fabricated into a finished article has improved fabricability manifested, e.g., by the ability to incorporate higher $TiO_2$ loadings into the composition uniformly. This improvement is also seen by improved yield due to reduced frequency of defects in finished articles. This aspect of the invention can be defined as an improvement in the process of melt extruding the fluoropolymer/$TiO_2$ composition, the improvement comprising conducting the melt extrusion with the pigment coated with organo silane.

Another embodiment is wire insulation or cable jacket fabricated from the composition of the invention.

DETAILED DESCRIPTION

Figure 1A:
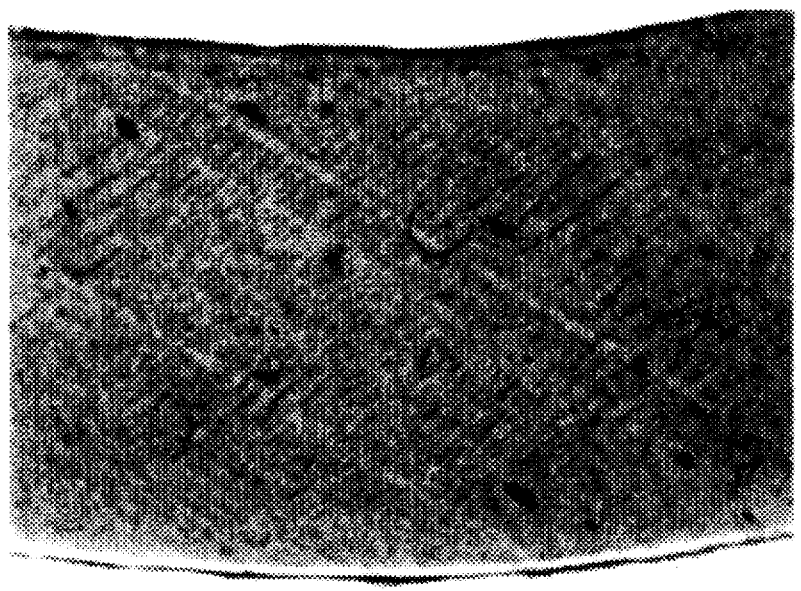
FIGS. 1(a) and (b). Photomicrographs at 70X magnification of FEP resin extrudates containing $TiO_2$ pigments, FIG. 1(a) without silane coating, showing scattered dark specks identified as pigment agglomerates, and FIG. 1(b) with organo silane coating, showing the essential absence of dark specks (agglomerates). The same improvement is shown in FIGS. 2 (a) and (b) to 5 (a) and (b) for $TiO_2$ pigmented compositions with other fluoropolymers.
Figure 1B:
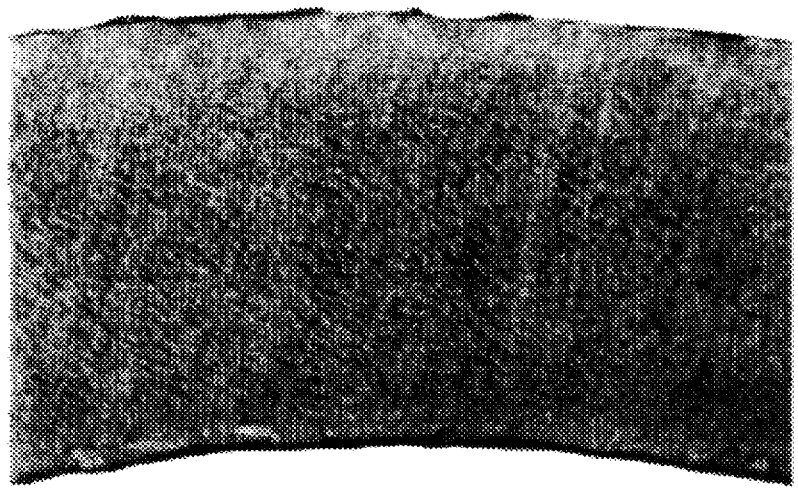
Figure 2A:
FIGS. 2 (a) and (b). Photomicrographs of PFA resin extrudate containing $TiO_2$ pigments, FIG. 2 (a) without silane coating and FIG. 2 (b) with organo silane coating.
Figure 2B:
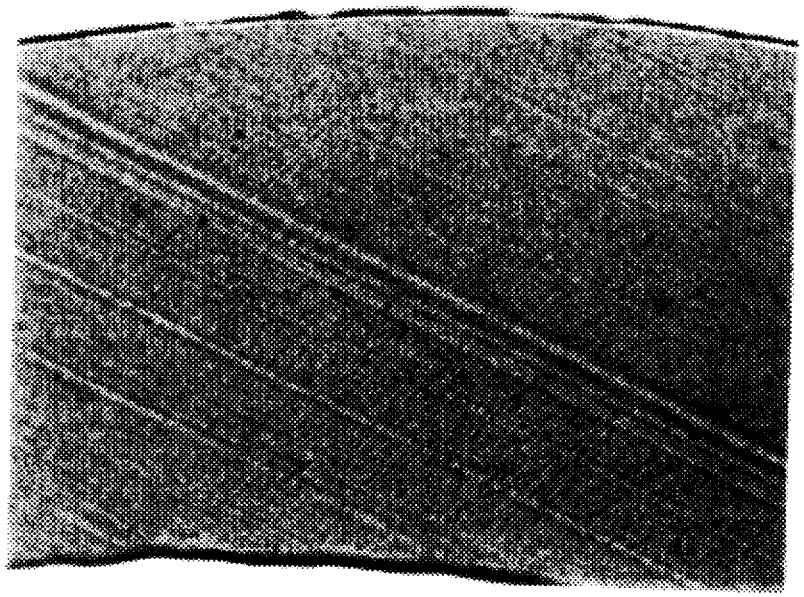
Figure 3A:
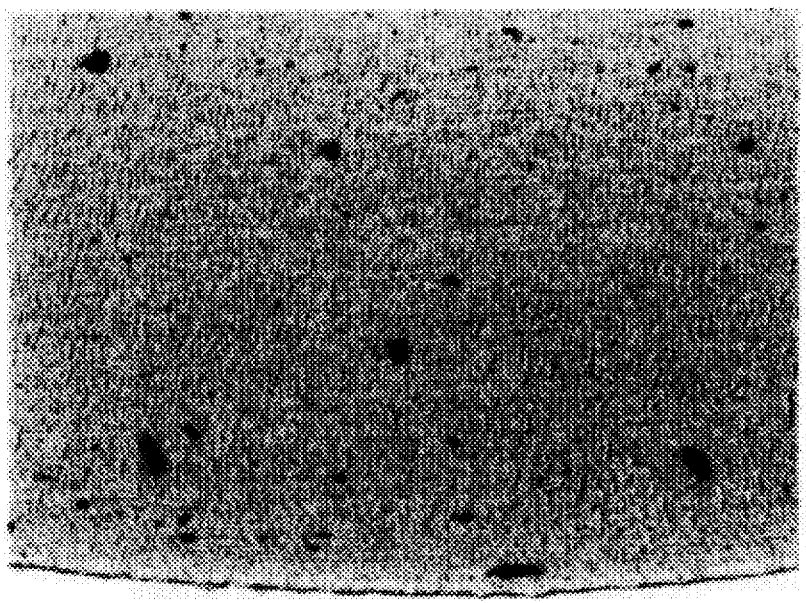
FIGS. 3 (a) and (b). Photomicrographs of ECTFE resin extrudate containing $TiO_2$ pigments, FIG. 3 (a) without silane coating and FIG. 3 (b) with organo silane coating.
Figure 3B:
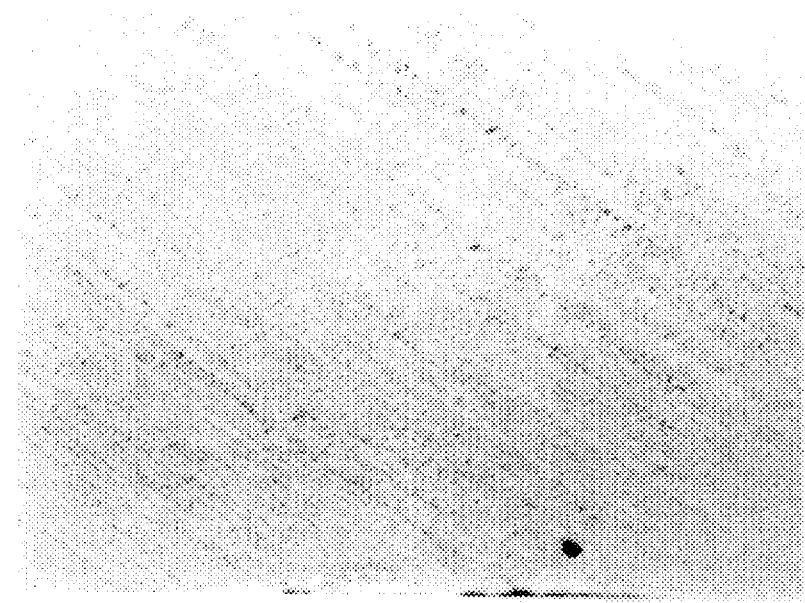
Figure 4A:
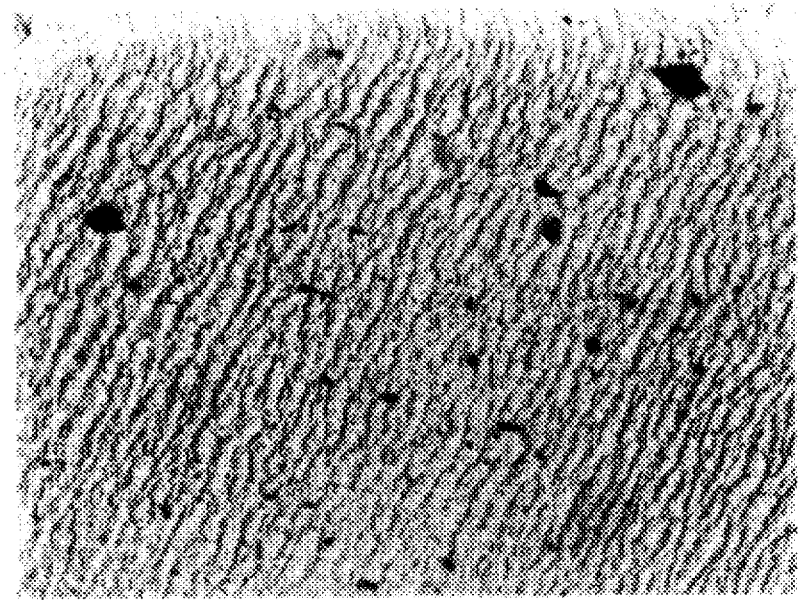
FIGS. 4 (a) and (b). Photomicrographs of PVDF resin extrudate containing $TiO_2$ pigments, FIG. 4 (a) without silane coating and FIG. 4 (b) with organo silane coating.
Figure 4B:
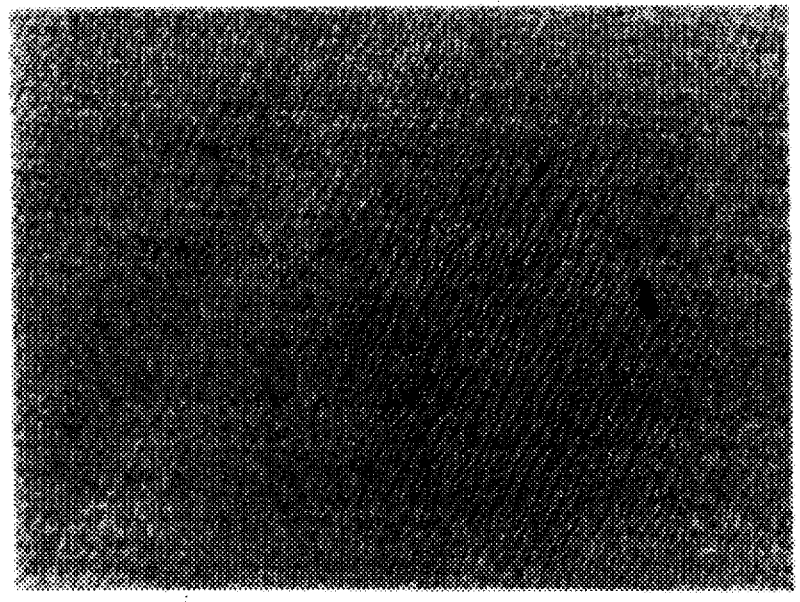
Figure 5A:
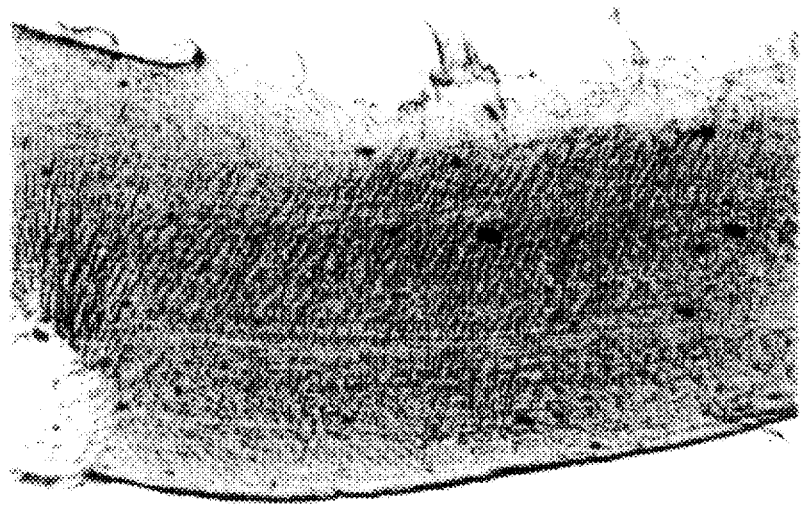
FIGS. 5 (a) and (b). Photomicrographs of ETFE resin extrudate containing $TiO_2$ pigments, FIG. 5 (a) without silane coating and FIG. 5 (b) with organo silane coating.
Figure 5B:

It has been discovered that titanium dioxide pigment coated with organo silane and incorporated in melt-fabricable fluoropolymer resin substrate provides an unexpected improvement in the contrast, and uniformity of contrast, of marks created in the substrate by the laser marking technique. While the mechanism for the improvement is not understood with certainty, the improvement in marking has accompanied the reduction in the level of TiO$_2$ agglomerates present in the fluoropolymer composition when melt fabricated. The reduction is evidenced both at agglomerate dimensions observable by optical microscopy at 70X magnification, at which scale agglomerates are substantially eliminated, and at agglomerate dimensions detectable only by electron microscopy. This effect of organo silane coating of TiO$_2$ on the pigmentation of fluoropolymers is surprising. If performance in this respect were a matter of compatibility between pigment and matrix, one would not expect the hydrocarbon character acquired by the TiO$_2$ pigment particle surface due to hydrocarbon organo groups of some silane coatings to provide any improved compatibility with a fluoropolymer over that of uncoated TiO$_2$.

Substrates suitable for marking by the improved laser marking method of this invention have matrices of melt-fabricable fluoropolymer resins. Fluoropolymers that can be used include those commonly used in applications for pigmented melt-fabricable polymers. Of particular interest are those fluoropolymers commonly used for extrusion of elongated shapes such as wire insulation, jacket for electrical or fiber optic cable, tubing, tape, and the like. Melt fabricable polymers useful in this invention include elastomeric polymers, but, obviously, elastomeric compounds will not include carbon black as a filler.

Fluoropolymers that can be used in the compositions of this invention are polymers of at least one flurorine-containing monomer, but may incorporate monomers containing no fluorine. The fluorinated monomers include those in the group consisting of fluoroolefins having 2–8 carbon atoms and fluorinated vinyl ethers (FVE) of the formula CY$_2$=CYOR or CY$_2$=CYOR'OR wherein Y is H or F, and —R, and —R'—are independently completely-fluorinated or partially-fluorinated linear or branched alkyl and alkylene groups containing 1–8 carbon atoms. Preferred —R groups contain 1–4 carbon atoms and are preferably perfluorinated. Preferred —R'— groups contain 2–4 carbon atoms and are preferably perfluorinated. Fluoropolymers used in this invention include but are not limited to the group of melt-fabricable copolymers of tetrafluoroethylene (TFE) with sufficient concentrations of at least one copolymerizable monomer to reduce the melting point significantly below that of PTFE. Such copolymers generally have melt viscosity in the range $0.5 \times 10^3$ to $60 \times 10^3$ Pa.s, but viscosities outside this range are known. Comonomers with TFE can include perfluoroolefins, FVE, and ethylene (E), for example, and these are preferred. Among perfluorinated comonomers, hexafluoropropylene (HFP) and perfluoro (alkyl vinyl ether), especially perfluoro(propyl vinyl ether) (PPVE), are most preferred. When the principal comonomer is E, minor amounts of a third monomer are commonly used to prevent high-temperature brittleness, with PPVE, perfluorobutyl ethylene (PFBE), and hexafluoroisobutylene (HFIB) being preferred. Other preferred fluoropolymers include chlorotrifluoroethylene (CTFE) polymers, including E/CTFE copolymers, and vinylidene fluoride (VF$_2$) polymers including homopolymers and VF$_2$ copolymers with one or more perfluoroolefins, particularly including HFP.

"Silanized" TiO$_2$ as used herein refers to TiO$_2$ pigment coated either with silane(s) or with a mixture of silane(s) and polysiloxane(s), also collectively referred to as organo silicon compounds.

TiO$_2$ pigment bases for the silanized TiO$_2$ useful in the present invention generally are in the rutile or anatase crystalline form. These are commonly made, respectively, either by a chloride process or by a sulfate process, though anatase may be subsequently calcined to the rutile form. In the chloride process, TiCl$_4$ is oxidized to TiO$_2$. In the sulfate process, titanium-containing ore is dissolved in sulfuric acid and the resulting solution goes through a series of steps to yield TiO$_2$. Both processes are described in greater detail in "The Pigment Handbook", Vol. 1, 2nd Ed., John Wiley & Sons, NY (1988). Certain finishing steps are commonly performed on the products of the foregoing processes, such as slurrying if not already a slurry, filtering, washing, drying, and milling with a fluid energy mill. Fluid energy milling involves introducing dry TiO$_2$ pigment and a fluid, e.g., air or steam, into the outer portion of an inwardly spiraling vortex so as to convey the TiO$_2$ at high velocity against the housing of the spiral vortex to fracture aggregates, as described in U.S. Pat. No. 4,427,451. Average TiO$_2$ particle size can be in the range 5–1000 nm, but is usually in the range 150–400 nm for effective performance as a white pigment. TiO$_2$ pigment bases used in this invention may contain other ingredients, usually but not always in the form of surface treatments. Additive substances include oxides such as alumina, silica, and tin oxide, as well as triethanolamine, trimethylolpropane, phosphates, fluorides, and the like. For use in the compositions of this invention, it is preferred if any such additives are of a ceramic type or other non-hydrated type to avoid potential release of water at processing temperatures of fluoropolymers.

Suitable silanes for use in the practice of this invention include silanes having the general formula

$$SiR_1R_2R_3R_4 \tag{1}$$

in which at least one R is a non-hydrolyzable organic group, such as alkyl, cycloalkyl, aryl, or aralkyl, having 1–20 carbon atoms, preferably 4–20 carbon atoms, most preferably 6–20 carbon atoms, and at least one R is a hydrolyzable group such as alkoxy, halogen, acetoxy, or hydroxy. The other two R are, independently, hydrolyzable or non-hydrolyzable as above. It is preferred that at least two, and especially that three, of the R are hydrolyzable. The non-hydrolyzable R can be fluorine substituted. A silane having the foregoing description is herein called "organo silane" in reference to the non-hydrolyzable R group(s). Preferably, non-hydrolyzable R are non-functional. Alkyl, cycloalkyl, aryl, and aralkyl are preferred non-hydrolyzable R, with alkyl being most preferred, including the possibility of any of these groups being fluorine substituted. When the hydrolyzable R are identical, the organo silane can be represented by

$$R'_xSiR''_{4-x} \quad (II)$$

in which R' is non-hydrolyzable and R" is hydrolyzable as defined above and x=1–3. Preferred R" include methoxy, ethoxy, chloro, and hydroxy. Ethoxy is especially preferred for ease of handling. Preferred silanes include octyltriethoxysilane, nonyltriethoxysilane, decyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane and octadecyltriethoxysilane. Mixtures of organo silanes can be used.

The concentration of organo silane is typically from about 0.1 to about 5 wt % based on total silanized pigmentary $TiO_2$, and preferably about 0.5 to about 1.5 wt %.

In an alternative embodiment, a mixture of organo silane with polysiloxane is useful in carrying out the invention. Suitable polysiloxanes are of the general formula

$$[R_nSiO_{(4-n)/2}]_m \quad (III)$$

in which R may be organic or inorganic, n=0–3, and m≥2. For example, polydimethylsiloxane (PMDS), vinyl phenylmethyl terminated dimethyl siloxanes, divinylmethyl terminated polydimethyl siloxane, and the like are suitable polysiloxanes. PDMS is a preferred polysiloxane. Organo silane useful in the mixture may be the organo silane described above. Combined concentration of organo silane and polysiloxane, based on total silanized pigmentary $TiO_2$, is from about 0.1 to about 5 wt %, preferably about 1–3 wt %. Especially preferred is about 0.5 to 1 wt % organo silane of formula (II) with R' being butyl or octyl, R" being alkoxy, x=1, and about 1 wt % PDMS. Desirably, the silane/polysiloxane ratio is in the range 1/2 to 2/1, and preferably is about 1/1.

Organo silanes and polysiloxanes are commercially available or can be prepared by processes known in the art. See, for example, S. Pawlenko, "Organosilicon Compounds", G. Thieme Verlag, New York (1980).

$TiO_2$ pigment may be treated with organo silane in a number of ways. Silane addition, for example, can be made neat or prehydrolyzed to a dry oxidation base, in a slurry, at a filtration step, during drying, at a sizing operation in a fluid energy mill (micronizer) or media mill, or in a blending step after grinding. For example, U.S. Pat. No. 3,834,924 describes organosilane and pigment dispersion mixed or blended directly in a suitable solids mixing apparatus. An example of post-blending is described in U.S. Pat. Nos. 3,916,735 and 4,141,751. Polysiloxane can be added in conjunction with silane or subsequent to silane addition. If water, either as liquid or vapor (steam) is present as a component of the process stream, hydrolysis of the hydrolyzable groups of the organo silane will occur and the silane coating will bond to the $TiO_2$ base. If the organo silane is added neat to the $TiO_2$ base, then moisture adsorbed on the $TiO_2$ will effect the hydrolysis. Hydrolysis of silanes is described in greater detail in "Organofunctional Silanes" by Union Carbide Corp. (1991). For preparation of the fluoropolymer compositions of this invention, it is most convenient if the hydrolysis of the hydrolyzable groups of the organo silane coating is done separately, and the silanized $TiO_2$ is ready for combination with fluoropolymer resin without need for attention to the coating process.

$TiO_2$ is frequently incorporated into polymeric materials for various purposes, including opacity, appearance, ultraviolet screening, identification, and so on. Fluoropolymers are among the polymeric materials in which $TiO_2$ is used, especially when the fluoropolymer is to be used as wire insulation or as cable jacket. The fluoropolymer compositions of this invention can have a wide range of silanized $TiO_2$ pigment concentration. If the concentration of $TiO_2$ is too low, effective pigmentation will not be achieved. If the concentration is too high, convenient processing and/or mechanical or electrical properties may be adversely affected. Generally, $TiO_2$ concentration can be in the range of from about 0.1 wt % to about 70 wt % based on combined weight of $TiO_2$ and fluoropolymer. A $TiO_2$ concentration range of about 0.25–10 wt % is preferred in finished articles. When the purpose is simply to produce a white color, a concentration in the range of about 0.25–2 wt % is usually adequate. Preferred compositions for laser marking contain 1–10 wt % of silanized $TiO_2$ pigment, most preferably 1–5 wt %. If one is preparing a concentrate for subsequent dilution by unpigmented fluoropolymer resin to arrive at a lower concentration such as recited in the preceding sentences, then it is usually appropriate to select a high concentration such as 5–30 wt %, or a higher concentration ranging up to 50 wt % or even to about 70 wt %.

$TiO_2$ coated with organo silane can be incorporated into melt-fabricable fluoropolymer to form the fluoropolymer composition of this invention by any melt compounding technique known in the art. In forming or processing the compositions of this invention, it is believed that there is no reactive interation between fluoropolymer and organic group of the organo silane. Generally, $TiO_2$ and fluoropolymer resin are brought together and then mixed in a blending operation that applies shear to the fluoropolymer melt. The fluoropolymer resin is usually available in the form of power, granules, pellets, or cubes. Commonly, $TiO_2$ and resin are first combined while the resin is in the solid state (not melted) and dry-blended in some way. This can be done in simple ways, such as by shaking in a bag or tumbling in a closed container, or in more sophisiticated ways such as by using blenders having agitators or paddles. $TiO_2$ and fluoropolymer resin can be brought together by co-feeding the materials to an extruder and allowing the screw to mix them together before the resin reaches the molten state. The melt blending of $TiO_2$ and fluoropolymer resin can be done using known equipment, such as single-screw extruders, twin-screw extruders, internal mixers, and the like. Extruders are commonly used. The melt blending can be done as part of the process of forming a finished article of the composition, as by melt extrusion. Alternatively, the melt blending can be done in a preliminary step, optionally isolating the fluoropolymer composition, e.g., as cubes, followed by forming a finished article in a subsequent process. As one skilled in the art will recognize, there are many possible variations of the technique for preparing fluoropolymer compositions of the invention. One may, for example, first prepare a concentrate having high $TiO_2$ concentration, i.e., one composition of the invention, and then combine the concentrate with fluoropolymer resin containing no $TiO_2$ to obtain another composition of the invention.

$TiO_2$-pigmented fluoropolymer compositions frequently have no constituents other than fluoropolymer resin and pigment. However, the use of other additives is known. ETFE resins, for example, commonly contain very low concentrations of copper stabilizer. As a further illustration, fluoropolymers are sometimes crosslinked, e.g., by irradiation after fabrication to final shape, in which case it is known to use crosslinking promoters. The use of such other additives is within the scope of this invention.

The fluoropolymer compositions of this invention exhibit reduced populations of $TiO_2$ agglomerates in the melt-fabricable fluoropolymer resin matrix. These improvements are deduced from analysis of thin sections by optical and electron microscopy, and are attributed to use of $TiO_2$ having an organo silane coating.

Another benefit of organo silane coating on $TiO_2$ pigment is improved processibility of fluoropolymer compositions, especially fluoropolymer compositions having high pigment concentrations. For example, a composition containing 15 wt % silanized $TiO_2$ can be easily extruded with better surface quality than compositions having lower concentrations of $TiO_2$ without silane coating. Furthermore, compositions containing silanized $TiO_2$ pigment can be converted into finished articles, such as wire insulation, with higher yield than compositions containing $TiO_2$ pigment without silane coating.

$TiO_2$-pigmented fluoropolymers are commonly used in wire and cable constructions, either as wire insulation surrounding the electrical conductor or as jacketing for a cable having one or more insulated wires. Such fluoropolymers can also be used as jacketing for fiber optic cables. Insulated wire and jacketed cable wherein insulation and jacket, respectively, comprise the fluoropolymer composition of this invention are also within the scope of this invention.

The surface of shapes, e.g., wire insulation and cable jacket, fiber optic bundle jacket, etc., formed from the fluoropolymer composition of this invention exhibits improved response to laser marking techniques. The improvement is evidenced by an increase in contrast between mark and background, and in uniformity of contrast. An improved method of laser marking based on the fluoropolymer composition disclosed herein is part of this invention.

EXAMPLES

Polymer resins used in the preparing compositions for the examples and controls are identified in Table 1. Where melt flow rate (MFR) is mentioned, measurement method is specified in the ASTM standard given for the resin. Patent references are cited for general methods of preparation.

TABLE 1

Fluoropolymer Resins

| Code | Identification or Description |
|---|---|
| FEP | Copolymer of TFE and about 8 mol % HFP, having MFR of about 7 and satisfying ASTM D-2116 Type I (U.S. Pat. No. 2,946,763) |
| PFA | Copolymer of TFE and about 1.3 mol % PPVE, having MFR of about 15 and satisfying ASTM D-3307, Type I (U.S. Pat. No. 3,528,954) |
| ETFE | Copolymer of E, TFE, and PFBE, having E/TFE ratio of about 0.9, about 1–2 mol % PFBE, and MFR of about 9, satisfying ASTM D-3159, Type II (U.S. Pat. No. 3,624,250) |
| ECTFE | Copolymer of ethylene and CTFE, ASTM D-3275 Type III (Halar ® grade 500, Ausimont) |
| PVDF | Believed to be copolymer of $VF_2$ and HFP, or blend of $VF_2$ homopolymer with $VF_2$/HFP copolymer (Kynar ® grade 2800, Atochem) |

Examples 1–10 illustrate various ways in which organo silane, or organo silane and polysiloxane, can be added to $TiO_2$.

Example 1

A $TiO_2$ pigment slurry in water, with 30–60 wt % solids and viscosity of 2200 cp, was treated with dilute NaOH to adjust pH to 9–11 and thereby reduce slurry viscosity to about 120 cp. The slurry was then processed through a 60-liter media mill at the rate of 3 gal/min (11.4 l/min) to achieve desired particle size reduction. At the discharge of the mill, the slurry was treated with 1 wt % octyltriethoxysilane (Union Carbide, now Osi) and spray dried to less than 1 wt % water.

Example 2

A $TiO_2$ pigment slurry, with 53 wt % solids and viscosity of 8500 cp, was treated with 0.2 ml of organic dispersant (amino methanol propane, 0.1 wt %) at room temperature and the slurry viscosity was thereby reduced to 20 cp. The slurry was then processed through a media mill as in Example 1. At the discharge of the mill, the slurry was treated with 0.8 wt % octyltriethoxysilane, stirred for 10 min at room temperature, and dried in an oven overnight to less than 1 wt % water.

Example 3

3000 g of neutralized pigmentary $TiO_2$ were weighed into a pan and sprayed with 30 g of butyltrimethoxysilane (Union Carbide Corp.). The treated pigment was processed (micronized) in a fluid energy mill. The micronized pigment was mixed in a Patterson-Kelley V-Blender with 30 g of polydimethylsiloxane (PDMS) (Huls Corp.).

Example 4

Example 3 was essentially repeated, except that octyltriethoxysilane was used instead of butyltrimethoxysilane.

Example 5

Neutralized pigmentary rutile $TiO_2$ was treated with about 1 wt % each of octyltriethoxysilane and PDMS essentially as for Example 3, except that these compounds were added at the fluid energy mill through existing nozzles in the grinding chamber.

Example 6

Pigmentary rutile $TiO_2$ was treated with about 1 wt % of octyltriethoxysilane by spraying, and processed through a fluid energy mill, essentially as for Example 3. PDMS was not present.

Example 7

Pigmentary rutile $TiO_2$ was treated with 1 wt % octadecyltriethoxysilane (Huls Corp.) by spraying.

Example 8

Example 7 was essentially repeated, except that methlytrimethoxysilane (Petrach) was used instead of octadecyltriethoxysilane.

Example 9

Example 6 was essentially repeated, except that hexyltrimethoxysilane (Petrach) was used instead of octyltriethoxysilane.

Example 10

Example 7 was essentially repeated, except that a solution in HFC-113 (1,1,2-trichloro-1,2,2-trifluoroethane) of a mixture of trichlorosilanes having fluorinated organo groups was used instead of octadecyltriethoxysilane. Such fluoroorgano silicon compounds are disclosed in U.S. Pat. No. 3,450,738. The solution is commercially available (Zonyl® fluorosilane, DuPont Co.). In this instance, the organo groups were alkyl of the formula —$CH_2CH_2C_nF_{2n+1}$ in which n was principally 8, 10 and 12. See U.S. Pat. No. 5,276,194 for more detailed description of the fluoroalkyl mixture. The concentration of silane mixture in the solution was approximately 50 wt %. In this case, the solution was sprayed on the $TiO_2$ and the HFC-113 was allowed to evaporate to deposit about 0.5 wt % of fluorosilane on the $TiO_2$.

Examples 8–22 deal with the properties of fluoropolymer compositions containing $TiO_2$, and with the state of $TiO_2$ in the fluoropolymer compositions.

Example 11 and Controls

This example illustrates the benefit of silanized $TiO_2$ for laser marking a substrate containing $TiO_2$ pigment. ETFE resin as described above was compounded with about 2 wt % of rutile $TiO_2$ coated with octyltriethoxysilane in accordance with any of Example 1, 2 or 6, and extruded onto AWG 20 stranded tin-plated copper conductor. AWG 20 stranded wire has diameter of about 0.037 inch (0.94 mm); diameter of the insulated wire was about 0.050 inch (1.3 mm). A similar insulated wire was prepared as Control A using a rutile $TiO_2$ that was not treated with silane. The wires were crosslinked by electron beam irradiation.

Both wires were marked using five different Vektronics Model WV 1200 laser marking machines, and contrast between the mark and the unmarked insulation was measured. Average values over several marks for each test are summarized in Table 2. Control A is relatively good, exhibiting contrast at the upper end of the prior art range. However, the marks on the wire insulation of this invention exhibit generally higher and more uniform contrast than the marks on the control. The raw data show that the higher contrast for the example of the invention has contributions both from higher reflectance of the background and lower reflectance of the marks, while the improvement in uniformity is due to more uniform reflectance of the marks. Additionally, five samples of Example 11 wire were marked with a Capris Model 500 laser marking machine (Spectrum Technologies, Ltd.). Contrast values for the five samples were in the very narrow range 79–81%, with an average value of 80%. This result is also shown in Table 2 (Laser 6).

Figure 6A:
FIGS. 6 (a) and (b). Photomicrographs of laser marks on ETFE wire insulation containing TiO$_2$ pigment showing, FIG. 6 (a) good contrast and FIG. 6 (b) low contrast.
Figure 6B:
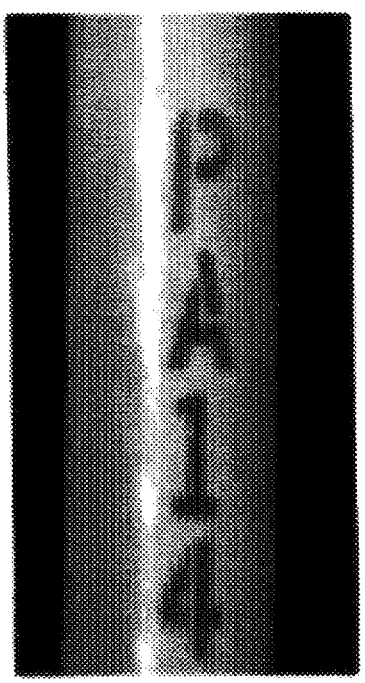
Figure 7:
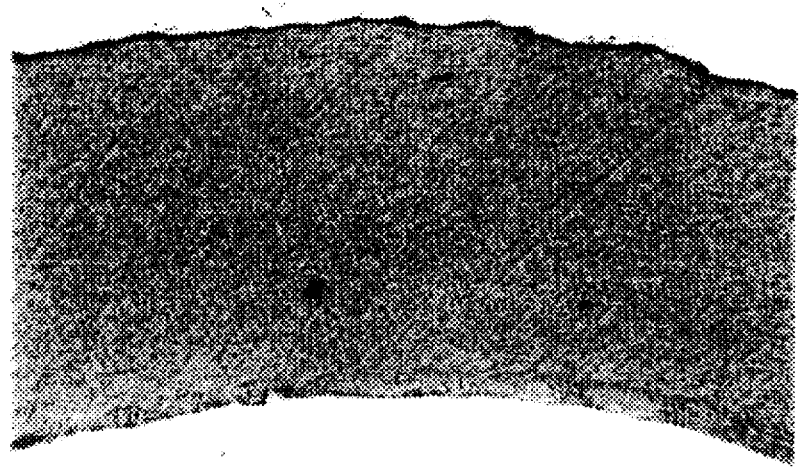
FIG. 7. Photomicrograph of ETFE resin extrudate containing TiO$_2$ pigment with silane/siloxane coating.
Figure 8:
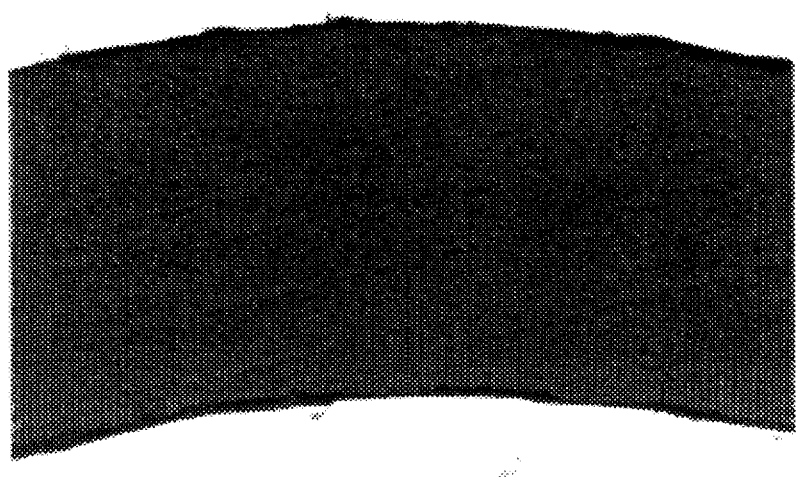
FIG. 8. Photomicrograph of ETFE resin extrudate containing TiO$_2$ pigment with ocatadecyl silane coating.
Figure 9:
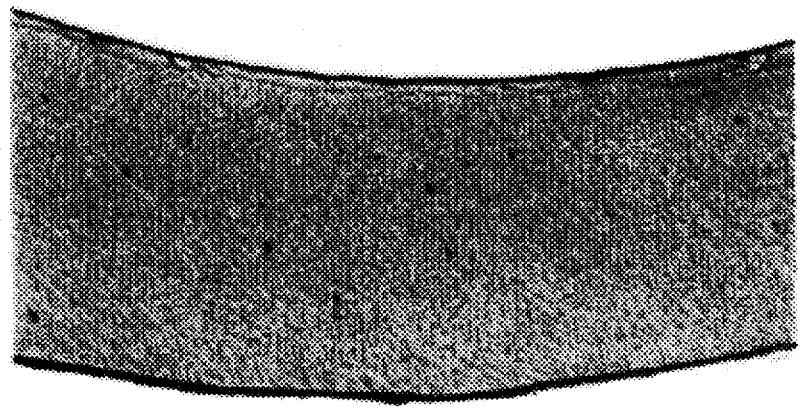
FIG. 9. Photomicrograph of ETFE resin extrudate containing TiO$_2$ pigment with methyl silane coating.
Figure 10:
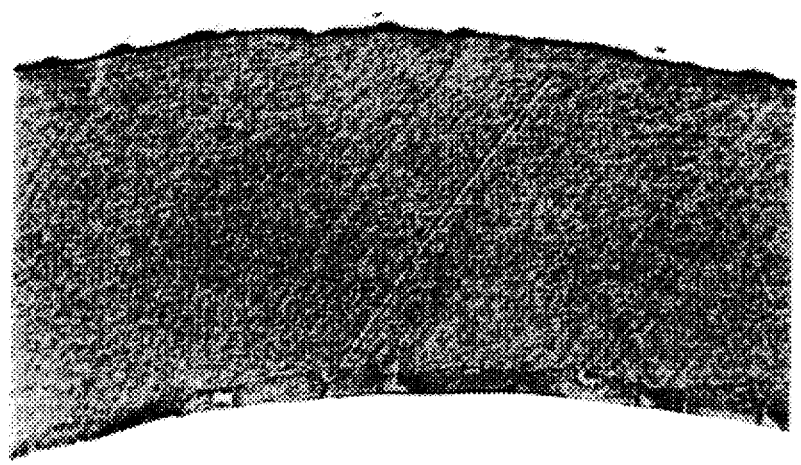
FIG. 10. Photomicrograph of ETFE resin extrudate containing TiO$_2$ pigment with hexyl silane coating.
Figure 11:
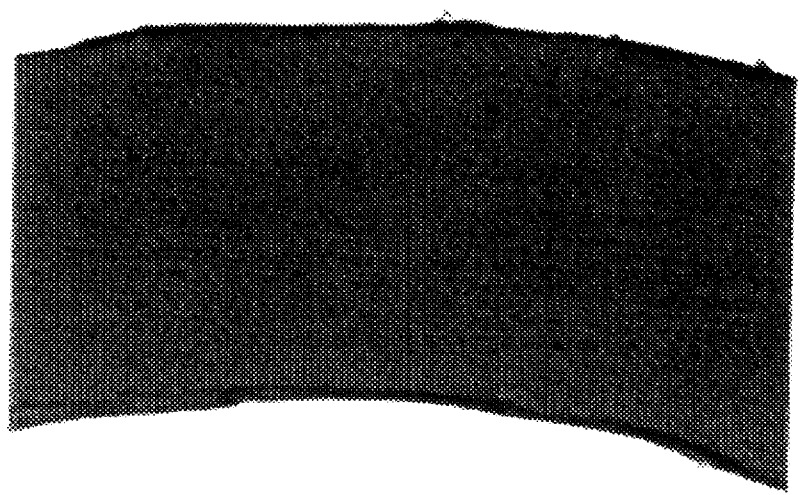
FIG. 11. Photomicrograph of ETFE resin extrudate containing TiO$_2$ pigment with fluoroalkyl silane coating.

Pieces of insulation were removed from the Example 11 wire and Control B wire shown in FIG. 6(b), sectioned, and examined by transmission electron microsopy (TEM). TEM micrographs taken at 11800X and 23000X magnification were analyzed using a Quantimet® Model 970 image analyzer and associated software (Cambridge Instruments) to determine $TiO_2$ particle size and particle size distribution. The micrographs were scanned into the image analyzer using a high resolution video camera. Number average particle sizes yielded by the analyses were 216 nm for Example 8 and 280 nm for Control B, treating all particles as spherical equivalents of the observed shapes. Particle size distributions were roughly log-normal in both instances, with distinctly higher populations of larger particles for Control B. Cumulative mass data provide more interesting information, and are summarized in Table 3. The first column gives some values of equivalent spherical diameter yielded by the analyses. The second and third columns, for Example 11 and Control B, respectively, give the fraction of $TiO_2$ particle mass having equivalent spherical diameter greater than the value stated in the first column. The differences between the two sets of data are greatest in the range of diameters around 300–500 nm. For example, Control B had 65% of $TiO_2$ mass present in particles with diameter larger than 382 nm, but only 46% exceeded this diameter for the example of the invention. Examination of 23000X micrographs revealed that many of the large particles for Example 11 and Control B were agglomerates, which image analysis treats as single particles. This comparison shows that the population of $TiO_2$ agglomerates having dimensions too small to observe under optical microscopy is reduced by organo silane coating of the $TiO_2$. Because of the extremely high TEM magnifications, this particular image analysis was not sensitive to exceptionally large agglomerates of the sort observed by optical microscopy in the controls for the following examples.

TABLE 2

Laser Marking Results

| | Contrast (%) | |
|---|---|---|
| Laser | Ex. 11 | Contr. A |
| 1 | 76 | 73 |
| 2 | 77 | 75 |
| 3 | 71 | 66 |
| 4 | 71 | 72 |
| 5 | 69 | 62 |
| 6 | 80 | — |

TABLE 3

Cumulative $TiO_2$ Mass Data for Example 11 and Control

| | Mass Exceeding Diameter (%) | |
|---|---|---|
| Diam. (nm) | Example 11 | Control B |
| 91 | 100 | 100 |
| 141 | 99 | 100 |
| 197 | 91 | 97 |
| 246 | 81 | 91 |
| 306 | 63 | 80 |
| 342 | 55 | 73 |
| 382 | 46 | 65 |
| 426 | 40 | 55 |
| 476 | 29 | 46 |
| 531 | 24 | 31 |
| 594 | 20 | 24 |
| 740 | 14 | 13 |

Examples 12–16 and Controls

For each of the polymer resins FEP, PFA, ECTFE, PVDF, and ETFE listed in Table 1, 10 lb (4.55 kg) of extrusion cubes were dry blended with 12.9 g of $TiO_2$ coated with octyltriethoxysilane by shaking cubes and silanized pigment together in a polyethylene bag to obtain a mixture that was 0.28 wt % white pigment. These are identified as Examples 12–16 in the order of resin codes above. Controls C–G labeled in the same order were prepared in the same way and at the same concentration using pigmentary rutile $TiO_2$ having oxide surface treatment (Ti-Pure® titanium dioxide pigment grade R-960, DuPont Co.) as the white pigment. The pigment loading chosen was at the low end of the range for white pigmentation in order that opacity not interfere with optical microsopy, below. Each of the blends was placed in the feed hopper of a 1.5-inch (38-mm) Davis Standard single screw extruder having length/diameter ratio of 24/1, and extruded through an in-line tubing die of about 0.75-inch (19-mm) diameter using melt temperatures appropriate to the individual resins. For Examples 12–13 and Controls C–D, the screw used had a mixing head design. For Examples 14–16 and Controls E–G, the screw was a barrier screw with a mixing head section. Tubing was not formed; instead, molten resin was collected in a shapeless mass at the die exit and allowed to solidify.

Sections about 0.02 mm thick were sliced from the solidified pigmented masses using a cryogenic microtome (R. Jung AG) and examined microscopically in transmitted light. Under 70X magnification, the examples appeared uniform and generally free from pigment agglomerates, while the controls exhibit pigment agglomerates which are seen as large dark spots in one-chip video photomicrographs (at 70X magnification) presented as FIGS. 1–5 corresponding to Examples 12–16 and controls. Thus, the use of $TiO_2$ having a coating of organo silane resulted in melt-fabricable fluoropolymer compositions substantially free from $TiO_2$ agglomerates at a scale of examination that complements the electron microscopy discussed in Example 11.

Examples 17–21

The procedures of Examples 16 were essentially repeated, this time using five different silanized $TiO_2$ pigments in ETFE fluoropolymer resin and harvesting tubing exit the die. The silanized $TiO_2$ were prepared according to Table 4. Photomicrographs at 70X magnification, FIGS. 7–11, show a hierarchy of results. The octadecyl and hexyl silanes (Examples 18 and 20) appeared to yield results equivalent to Example 16. The fluoroalkyl silane (Example 21) yielded a few small agglomerates in this test. The mixed coating of butyl silane and PDMS (Example 17) yielded fewer but larger agglomerates. The methyl silane (Example 19) yielded a larger number of small agglomerates. A repeat of Control G yielded photomicrographs similar to FIG. 5(a).

TABLE 4

| Silanized $TiO_2$ for Examples 17–21 | | |
|---|---|---|
| Example | Silanized $TiO_2$ | FIG. |
| 17 | Example 3 | 7 |
| 18 | Example 7 | 8 |
| 19 | Example 8 | 9 |
| 20 | Example 9 | 10 |
| 21 | Example 10 | 11 |

Example 22

The silanized and control $TiO_2$ pigments used in Examples 12–16 and Controls were dry-blended with melt-fabricable fluoropolymer extrusion pellets in various proportions to yield mixtures with pigment concentration in the range 5–30 wt %. The fluoropolymer was a TFE copolymer similar to that used in Example 12 but having MFR of about 22. Selected blends were extruded through a dual beading die with orifice diameters of 0.25 inch (6.4 mm) using a 1.5-inch (38-mm) Brabender Model 15-02 twin screw mixer, with a melt temperature of about 315° C. at the die. The beadings were quenched in water and chopped into pellets. Compositions containing the control pigment at concentrations of 10–30 wt % extruded poorly as judged by extrudate surface quality, exhibiting roughness including bumps. Only a composition with 5 wt % of control pigment extruded reasonably well by this standard, but extrudate still had surface bumps. A composition containing 15 wt % of silanized $TiO_2$ extruded well, exhibiting even better surface quality than the composition with 5 wt % of control pigment without organo silane coating.

Pellets containing 15 wt % of each pigment from the preceding experiments were dry-blended with resin containing no $TiO_2$ in a ratio of 3/97 to obtain blends containing 0.45 wt % pigment. These blends were then used to extrude white insulation onto AWG 24 solid copper conductor using a 60-mm Nokia Maillefer single screw extruder having length/diameter ratio of 30/1, equipped with a Maillefer 4/6 crosshead, a screw with mixing head, a 0.315-inch (8-mm) diameter die, and a 0.188-inch (4.8-mm) guider tip. Melt temperature was about 765° F. (407° C.). Line speed was 1500 ft/min (457 m/min) and drawdown ratio was about 100/1. The extrudate was air-cooled for about 45 ft (13.7 m), passed through a 2-ft (0.6-m) water bath, then travelled in air through a bead-chain spark tester operating at 2.5 kV to a takeup system. Resultant insulation thickness was 0.005–0.0055 inch (0.13–0.14 mm). Approximately 30,000 ft (9150 m) of wire insulated with each composition was produced. Additionally, a similar quantity of wire insulated with the natural fluoropolymer resin (no pigment) was produced. The insulation made from the composition containing silanized pigment had four faults at the spark tester, while faults were too numerous to count for the construction containing pigment without silane coating. The construction containing no pigment had one fault. These results show the benefit of fluoropolymer compositions containing silanized pigment in fabricating finished articles.

What is claimed is:

1. A fluoropolymer composition consisting essentially of melt-fabricable fluoropolymer and about 0.1–70 wt % of crystalline titanium dioxide pigment coated with a coating comprising organo silane wherein the said organo silane has the formula $SiR_1R_2 R_3R_4$ wherein at least one R group is a non-hydrolyzable non-functional organic group and at least one R group is a hydrolyzable group selected from the group consisting of alkoxy, acetoxy and hydroxy, the remaining R groups being selected from the group consisting of said non-hydrolyzable organic group and said hydrolyzable group.

2. The fluoropolymer composition of claim 1, wherein said coating further comprises polysiloxane.

3. An insulated wire, wherein the insulation comprises the fluoropolymer composition of claim 1.

4. A jacketed cable, wherein the jacket comprises the fluoropolymer composition of claim 1.

5. The fluoropolymer composition of claim 1 wherein the amount of said pigment present in said composition is 1 to 5 wt %.

6. The fluoropolymer composition of claim 1 wherein said non-hydrolyzable non-functional organic group is selected from the group consisting of alkyl, cycloalkyl, aryl, and aralkyl having 1 to 20 carbon atoms.

7. The fluoropolymer composition of claim 1 wherein said fluoropolymer is tetrafluoroethylene copolymer.

* * * * *